United States Patent
Zanichelli et al.

(10) Patent No.: US 12,140,307 B2
(45) Date of Patent: Nov. 12, 2024

(54) BURNER FOR SYNTHESIS GAS WITH IMPROVED COOLING

(71) Applicant: Casale SA, Lugano (CH)

(72) Inventors: Luca Zanichelli, Milan (IT); Nicola Panzeri, Breganzona (CH); Fabiano Montini, Taverne (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 18/689,278

(22) PCT Filed: Aug. 12, 2022

(86) PCT No.: PCT/EP2022/072723
§ 371 (c)(1),
(2) Date: Mar. 5, 2024

(87) PCT Pub. No.: WO2023/036559
PCT Pub. Date: Mar. 16, 2023

(65) Prior Publication Data
US 2024/0328616 A1 Oct. 3, 2024

(30) Foreign Application Priority Data
Sep. 8, 2021 (EP) .................... 21195582

(51) Int. Cl.
*F23D 14/22* (2006.01)
*B33Y 10/00* (2015.01)
*F23D 14/58* (2006.01)

(52) U.S. Cl.
CPC .............. *F23D 14/22* (2013.01); *B33Y 10/00* (2014.12); *F23D 14/58* (2013.01); *F23D 2214/00* (2013.01)

(58) Field of Classification Search
CPC ........ F23D 14/58; F23D 14/00; F23D 14/583; F23D 2212/20; F23D 2203/101;
(Continued)

(56) References Cited

U.S. PATENT DOCUMENTS

2007/0261304 A1* 11/2007 Zanichelli .............. B01J 8/0278
48/187
2015/0107074 A1* 4/2015 Zanichelli .............. B01J 8/0257
29/401.1
(Continued)

FOREIGN PATENT DOCUMENTS

| CN | 110 469 847 A | 11/2019 |
| DE | 10 2015 202579 A1 | 8/2016 |
| DE | 20 2017 107810 U1 | 1/2018 |

OTHER PUBLICATIONS

International Search Report issued Nov. 24, 2022 in connection with PCT Application No. PCT/EP2022/072723.
(Continued)

*Primary Examiner* — Alfred Basichas
(74) *Attorney, Agent, or Firm* — Akerman LLP

(57) ABSTRACT

A burner (1) for the production of synthesis gas, configured to feed a reactant stream and an oxidant stream into a reaction chamber, the burner comprising at least one cooled component (11, 12), wherein said cooled component comprises channels (20) to convey a cooling medium, a cooling medium header (24) and a cooling medium collector (25), wherein said channels, said cooling medium header and said cooling medium collector are integrally formed within said cooled component of the burner.

16 Claims, 6 Drawing Sheets

(58) Field of Classification Search
CPC ................ F23D 2212/10; C01B 3/363; C01B 2203/0872; C01B 2203/0255; C01B 2203/0244
See application file for complete search history.

(56) References Cited

U.S. PATENT DOCUMENTS

| | | | | |
|---|---|---|---|---|
| 2019/0346140 A1* | 11/2019 | Kiener | .................... | F23D 14/22 |
| 2020/0018483 A1* | 1/2020 | Hockley | ................. | F23R 3/343 |
| 2022/0098035 A1* | 3/2022 | Zanichelli | ............... | C01B 3/363 |

OTHER PUBLICATIONS

Written Opinion of the International Searching Authority issued Nov. 24, 2022 in connection with PCT Application No. PCT/EP2022/072723.

International Preliminary Report on Patentability issued Nov. 27, 2023 in connection with PCT Application No. PCT/EP2022/072723.

\* cited by examiner

BURNER FOR SYNTHESIS GAS WITH IMPROVED COOLING

CROSS-REFERENCE TO RELATED APPLICATIONS

This application is a national phase of PCT/EP2022/072723, filed Aug. 12, 2022, and claims priority to EP 21195582.8, filed Sep. 8, 2021, the entire contents of both of which are hereby incorporated by reference.

FIELD OF APPLICATION

The invention relates to a burner for the production of a synthesis gas.

PRIOR ART

The production of various chemical commodities, such as methanol, ammonia and synthetic fuel for example, requires conversion of a hydrocarbon source into a synthesis gas (syngas) which in most cases is a mixture of carbon monoxide, carbon dioxide and hydrogen. Syngas can be produced from many sources, including natural gas, coal, biomass, or virtually any hydrocarbon feedstock following a reforming process.

Generally, the production of synthesis gas involves that an oxidizable process gas is brought into contact with an oxidizer. The oxidizable process gas may be for example natural gas or another hydrocarbon-containing gas, or a partially reformed gas produced in a previous reforming step, for example in a primary reformer. The oxidizer is an oxygen-containing stream such as air, oxygen or oxygen-enriched air. The reaction between the process gas and the oxidizer is performed in a suitable reaction chamber, which is also termed combustion chamber.

A burner for the production of synthesis gas is typically a device designed to introduce the process gas and the oxidizer into the reaction chamber. For example the burner can be mounted on top of a vessel which define the reaction chamber. A known burner design comprises coaxial channels for the process gas and the oxidizer. The burner may be designed to provide a suitable motion, for example a swirling motion, to one or both streams, in order to facilitate the contact between the process gas and the oxidizer.

Inevitably, the burner is exposed to the high temperature and high pressure in the reaction chamber. Some parts of the burner may be exposed to a combustion flame formed in the reaction chamber, resulting in a considerable thermal stress of the burner.

The prior art has developed burners wherein at least the parts most exposed to thermal stress are internally traversed by a cooling medium, e.g. with a water-cooled nozzle. A related drawback is that cooled parts require a double-wall construction and a relatively large chamber for the circulation of the cooling medium. This design suffers the increase of pressure of the cooling side. It must be noted that, in many practical cases, the cooling medium must be kept at a pressure greater than the pressure in the reaction chamber, to prevent the gas in the reaction chamber from entering in the cooling circuit.

Due to the relatively large size of the cooling medium chamber, the internal pressure causes considerable stresses in the burner body. The wall thickness of the burner must be increased to withstand the internal pressure but increasing the wall thickness will reduce the cooling effect. A further drawback is that a large flowrate of cooling medium is required, due to the large size of the chamber. Therefore, the prior art of double-walled internally cooled burners is not completely satisfactory.

DE 10 2015 202579 discloses a burner configured to feed a reactant stream and an oxidant stream into a reaction chamber.

SUMMARY OF THE INVENTION

The invention aims to overcome the above drawbacks of the prior art. In particular, the present invention faces the problem of how to realize a burner for the introduction of a process gas and an oxidant gas into a reaction chamber with an improved structure for cooling.

The aim is reached with a burner according to claim 1.

The burner is configured to feed a reactant stream and an oxidant stream into a reaction chamber and comprises at least one cooled component. Said cooled component comprises a plurality of channels arranged in parallel to convey a cooling medium; a cooling medium header and a cooling medium collector directly connected to said channels. Said channels, said cooling medium header and said cooling medium collector are integral within the body of said cooled component of the burner.

The channels are arranged such as to convey the cooling medium to the hot surfaces of the cooled component and to collect back the cooling medium.

This design allows to obtain a large number of densely packed, small channels embedded within the cooled component. The channels can be packed very tightly together thus achieving a uniform cooling. On the other hand, the small size of each individual channel provides a good resistance to pressure of the cooled component.

It can be said that the cooling circuit, being realized with a large number of small channels integrally formed within the structure of the cooled component, has a small impact on the structural integrity and resistance of the component, compared with prior-art solution using a large chamber for the internal circulation of the cooling medium.

The channels are integral within the structure of the burner or of its cooled component. This term is used to denote that the channels are obtained within the thickness of the cooled component and are not separate parts inserted in the component.

Hence, a burner in accordance with the invention can operate at a high temperature and high pressure without the need to increase the wall thickness of the parts exposed to the high-temperature environment. Also, a large number of small channels allows for effective cooling with a small velocity of the cooling medium, thus reducing the pressure drop. Still another advantage is that the shape of the channels can be easily adapted to the shape of the cooled component.

Furthermore, a clogging of one or more cooling channels has minor impact on the operating temperature of the burner body, being the clogged region cooled by the adjacent channels.

DETAILED DESCRIPTION OF THE INVENTION

The at least one cooled component may be arranged to face a reaction chamber where the reactant stream and oxidant stream are brought into contact and react. Hence said cooled component may be a component which is directly exposed to the high temperature developed in the reaction chamber. Said component can be, for example, a nozzle of the burner.

In first embodiments, said channels are arranged in a plurality of pairs, each pair comprising one first channel which is an inflow channel arranged to convey the cooling medium towards a target portion of the cooled component and one second channel which is an outflow channel arranged to collect the cooling medium from said target portion, the first channel and the second channel of the pair being connected to each other. Said target portion may be for example a tip of the cooled component.

Hence, in these embodiments the inflow channels and outflow channels are connected one to one, each inflow channel being in communication with one respective outflow channel.

Preferably, each of said pairs is configured substantially as a U-tube connected to the cooling medium header, said U-tube having a first arm acting as inflow channel to deliver the cooling fluid towards the target portion of the cooled component and a second arm acting as outflow channel.

In second embodiments, the burner further includes a cooling medium collection chamber, which is also integrally formed within said cooled component of the burner. Said collection chamber is separated from said cooling medium header and collector and is directly connected to all said channels.

The cooling medium collection chamber, in the above mentioned second embodiments, provides a collector for the inflow cooling medium and, at the same time, acts as a distributor for the outflowing medium. An advantage of these embodiments with a cooling medium collection chamber is that in the event that one or more channels are obstructed, the system is able to redistribute the colling medium. Hence these embodiments may be preferred as they are less affected by a possible obstruction of some cooling medium channels.

Said cooled component of the burner is made with a 3D printing technique. In that case, the first channels, the second channels, the cooling medium header and, if provided, the cooling medium collector, can be made during the 3D printing of the component. Any suitable 3D printing technique may be used for manufacturing of said component of the burner, for example selective laser sintering (SLS). 3D printing is particularly suitable to create channels of a very small size and/or elaborate shape, to conform to the shape of the cooled component.

In a preferred arrangement, said inflow channels and said outflow channels are distributed on a circumference, thus forming a circular array of channels. More preferably the inflow channels and the outflow channels alternate in the array of channels and even more preferably the channels are evenly distributed along the array of channels.

The cooled component includes preferably a large number of small cooling channels. Preferably the channels have a circular section so that their size is denoted by the diameter. In case of non-circular section, reference can be made to an equivalent diameter.

The at least one cooled component of the burner may include a nozzle and a body coaxially arranged around the nozzle, the nozzle having a central aperture for one of the reactant stream and oxidant, and the body defining an annular passage around the nozzle for the other of the reactant stream and oxidant.

In some embodiments said nozzle may be configured for the formation of a diffusion flame outside the burner.

In the preferred embodiments, the cooling channels are numerous and comparatively small in relation to the cross section of the cooled component where they are formed.

The size of the cooling channels may be denoted by an equivalent diameter. The equivalent diameter of a channel having a generic (non-circular) cross section corresponds to the diameter of a circular channel having the same cross-sectional area of said channel.

The equivalent diameter may be referred to the local thickness of the cooled component, i.e. the thickness of the component around the channel.

In a preferred embodiment, the cooling channels have an equivalent diameter which, for each section of each channel, range from 20% to 90%, preferably from 30% to 70% of the local thickness of the cooled component around the section of the channel.

The distance between each pair of adjacent channels (thickness of material separating the channels) is preferably 10% to 200%, or more preferably between 10% to 90% of the local thickness of the cooled component around the pair of channels.

The cooling channels are preferably distributed over the entire cross section of said cooled component. More specifically, for each cross section of the cooled component where cooling channels are present, said cross section being in a plane perpendicular to axes of the cooling channels, the channels are distributed over the entire cross section of said cooled component. More preferably the channels are evenly distributed over the cross section of the cooled component.

The size and/or the arrangement of the cooling channels may vary according to the cooling needs of specific regions of the cooled component of the burner. The cooling channels may be more or less densely packed and/or larger or smaller depending on the heat flux that must be removed for a proper cooling.

Accordingly, in some embodiments, the cooling component of the burner may comprise at least one region with a first number of channels and/or channel spacing, and a second region with a second and different number of channels and/or channel spacing, according to local cooling needs.

More generally, the channel spacing and number can be changed according to the local cooling needs, i.e. channels can be stacked closer in regions where more cooling is needed and placed more further apart in less critical regions. In the same way the equivalent diameter of channels may vary according to the local cooling requirements.

The invention relates also to an equipment for the production of synthesis gas by reacting an oxidizable process gas with an oxidant gas, the equipment comprising a reaction chamber and a burner arranged to feed said process gas and oxidant gas into the reaction chamber, the burner being in accordance with any of the embodiments of the present invention.

According to preferred applications of the invention, the equipment is any of: an autothermal reformer; a non-catalytic partial oxidation reactor; a catalytic partial oxidation (CPO) reactor.

The invention further relates to a process for the production of synthesis gas with an equipment or a burner according to the invention.

In a greater detail, interesting applications of the invention include autothermal reforming (ATR) and partial oxidation (POX). Both the ATR and the POX involve the combustion of a hydrocarbon source with an oxidant which may be oxygen, air or enriched air.

Autothermal reforming is performed over a catalyst and also requires the presence of steam as a reactant. In autothermal reforming, the burner is typically installed on top of a reactor; the reactor contains a reaction chamber above a catalytic bed. The reactant and oxidant delivered by the burner produce a hot gas in the reaction chamber, which is further reacted in the catalytic bed. In an interesting application, autothermal reforming is used in the front-end of an ammonia production plant, for the production of a make-up gas for the synthesis of ammonia.

Partial oxidation is non-catalytic reforming reaction typically carried out in a high-pressure refractory-lined reactor. For example, in the partial oxidation a hydrocarbon source such as natural gas is partially oxidized to produce a gas comprising $H_2$, $CO$ and $CO_2$. Still a further application of the invention is catalytic partial oxidation or short-contact catalytic partial oxidation (CPO).

Typically, the operating temperature of autothermal reforming is in the range of 950-1050° C. at the reactor outlet and around 1200° C. at the catalyst inlet whilst the partial oxidation, due to the absence of the catalyst, is performed at higher temperatures typically comprised between 130° and 1700° C. at the reactor outlet.

Still another aspect of the invention is a method for the manufacturing of a burner for the production of synthesis gas, the burner being configured to feed a reactant stream and an oxidant stream into a reaction chamber, the method comprising the manufacturing of at least one cooled component of the burner with a plurality of internal channels arranged in parallel for the circulation of a cooling medium, the method including that said channels are made within the cooled component.

In an interesting embodiment, the cooled component is made by additive manufacturing and said channels for the cooling medium are obtained during the additive manufacturing process.

DETAILED DESCRIPTION OF THE PREFERRED EMBODIMENTS

Figure 1:
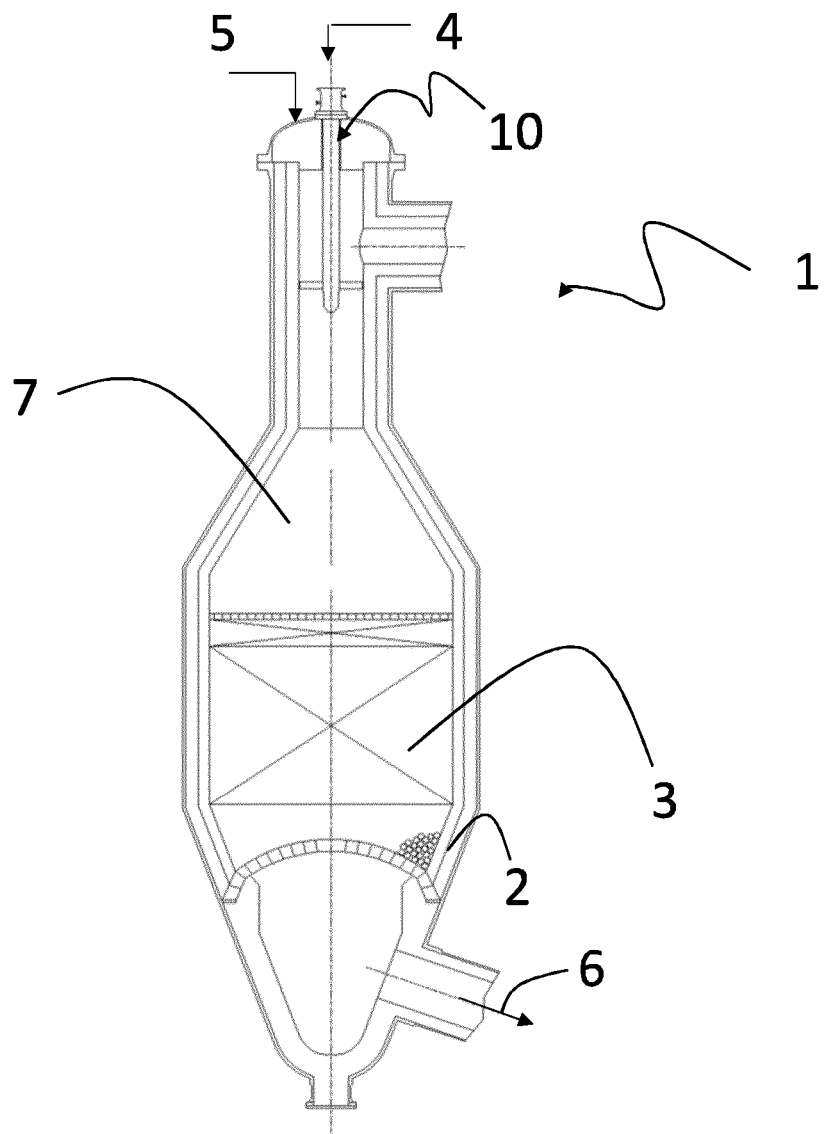
FIG. 1 is a schematic section of an equipment for the production of synthesis gas according to an embodiment of the invention.

FIG. 1 illustrates an ATR reactor 1 including a reaction chamber 2 which contains a catalytic bed 3. A burner 10 is mounted on top of the reactor 1 and is fed with a reformable fuel stream 5 and an oxidant 4. The fuel and oxidant come into contact and react in the region 7 above the catalytic bed 3, then the reforming reaction is performed through the bed 3 to produce the output reformed gas 6.

The burner 10 may comprise one or more components cooled by a cooling medium, such as water, flowing through small channels embedded in the cooled component.

Figure 2:
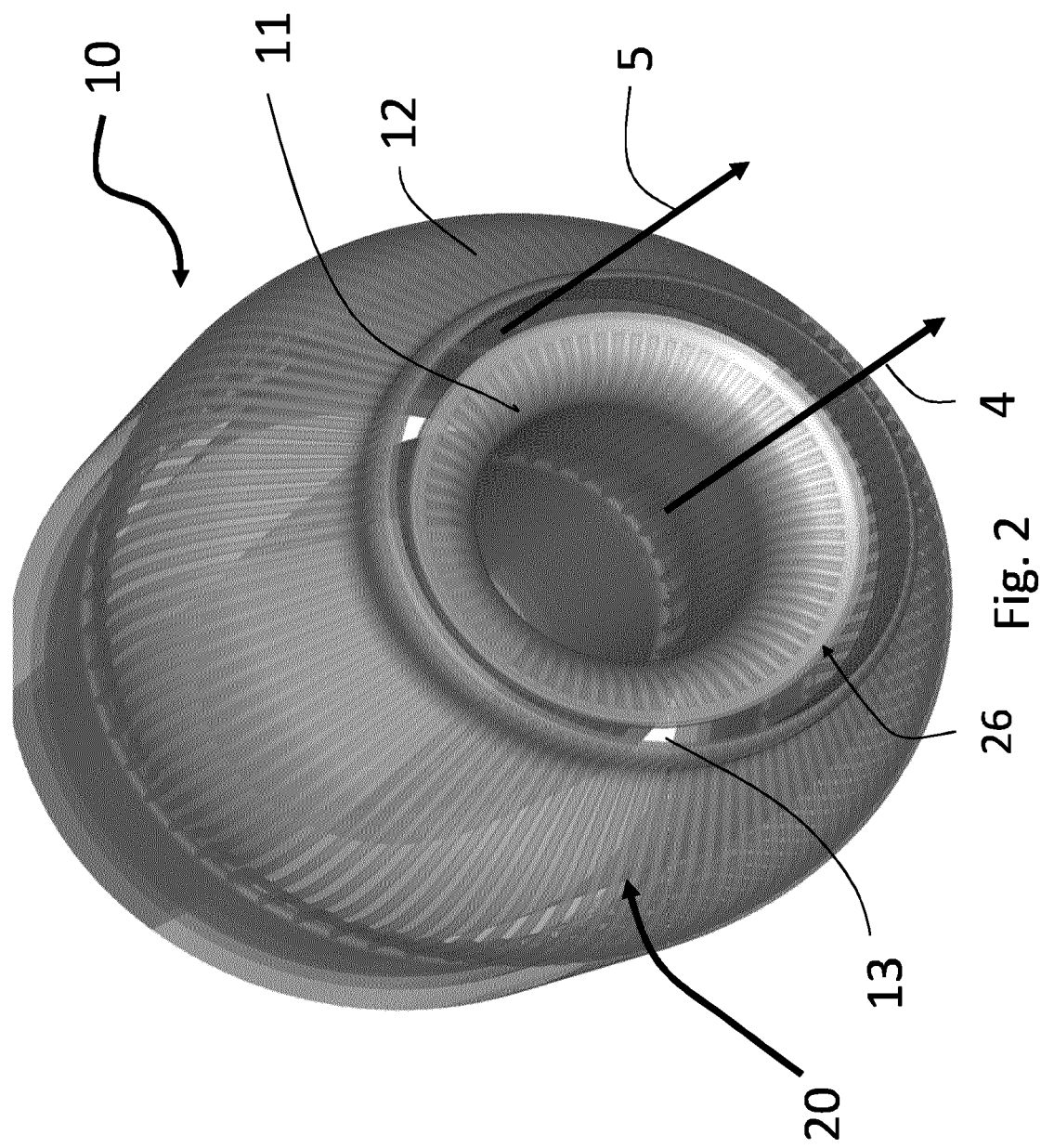
FIG. 2 illustrates a portion of a burner according to an embodiment of the invention.

FIG. 2 illustrates an example of the burner 10 including a central nozzle 11 coaxially surrounded by an annular body 12. The oxidant stream 4 is delivered by the nozzle 11; the fuel 5 is fed via the annular channel 13 between the nozzle 11 and the annular body 12.

Both the nozzle 11 and the annular body 12, in this example, include a multitude of cooling channels 20 integrally formed in the structure of the nozzle 11 and body 12, respectively.

Figure 3:
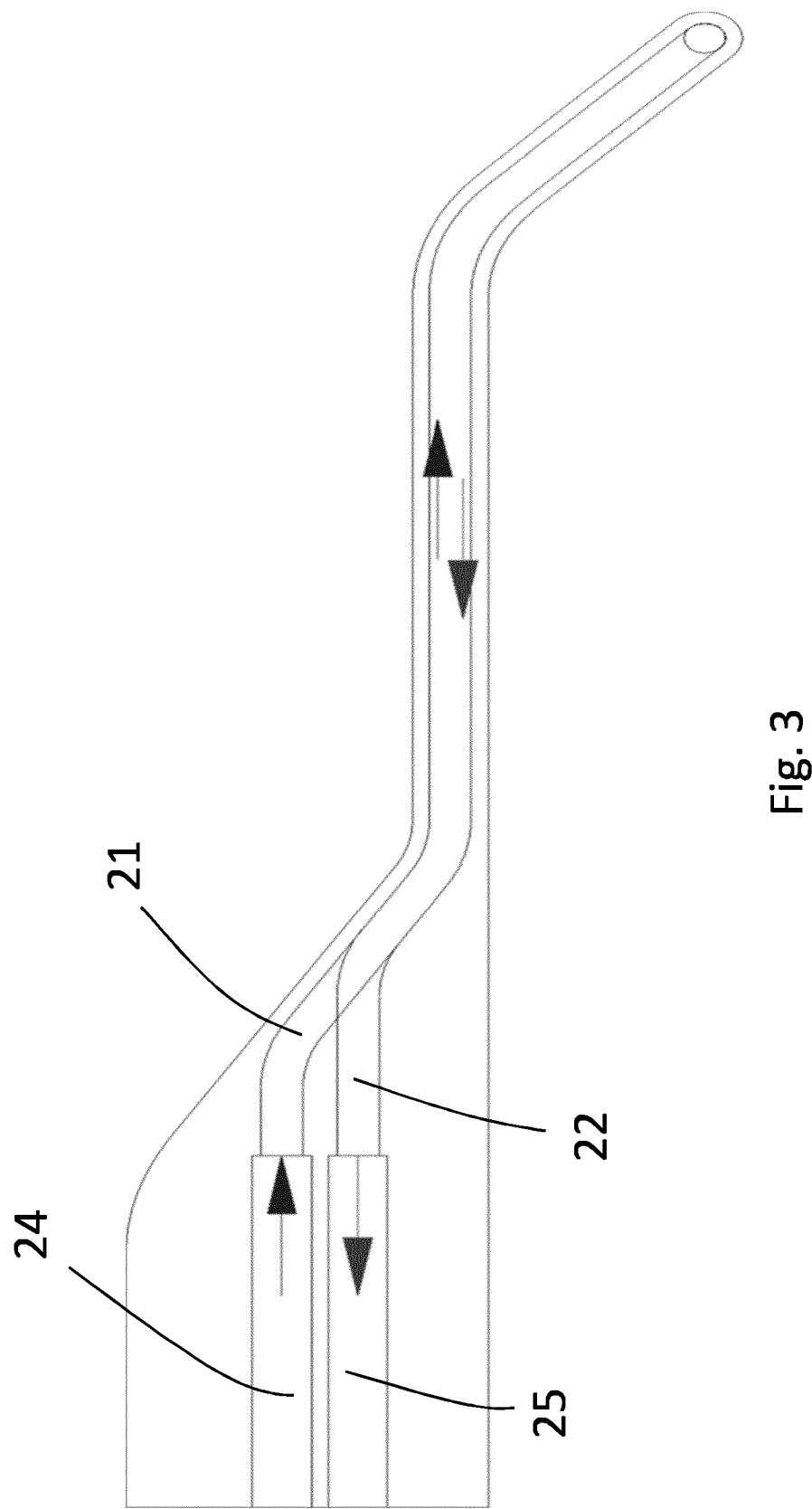
FIGS. 3-4 are a scheme of cooling channels in a burner according to an embodiment of the invention.
Figure 4:
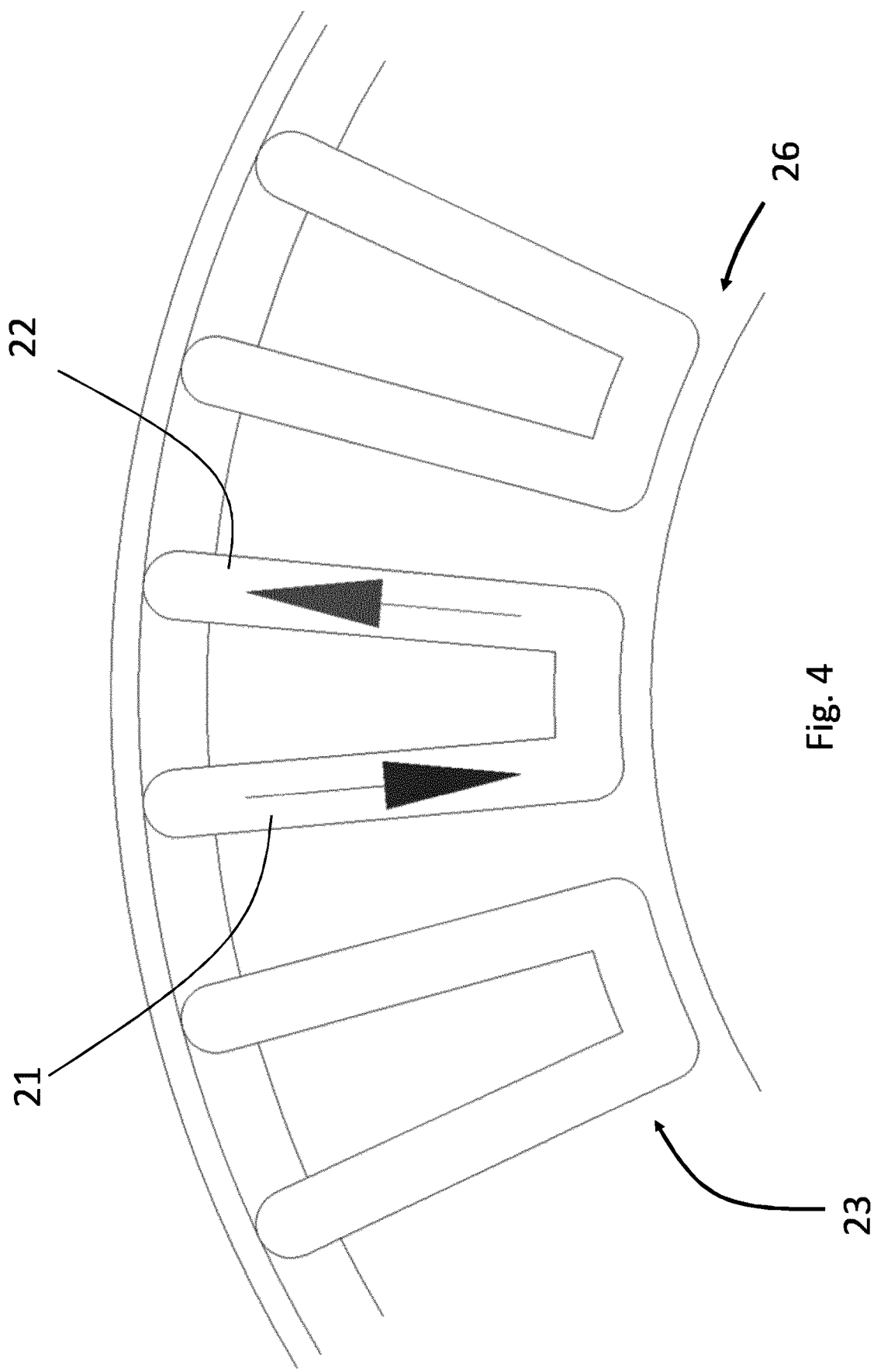

FIGS. 3-4 illustrate, schematically, a first arrangement of the channels 20.

The channels 20 include inflow channels 21 and outflow channels 22, connected in pairs to form U-shaped channels 23. Each pair is connected to a distributor 24 and to a collector 25. The inflow channels 21 convey the cooling medium towards a tip 26 of the respective component, that is the nozzle 11 or the body 12. The tip 26 is most exposed to the high temperature in the region 7 of the reactor 1. The outflow channels 22 convey the cooling medium back to the collector 25.

Figure 5:
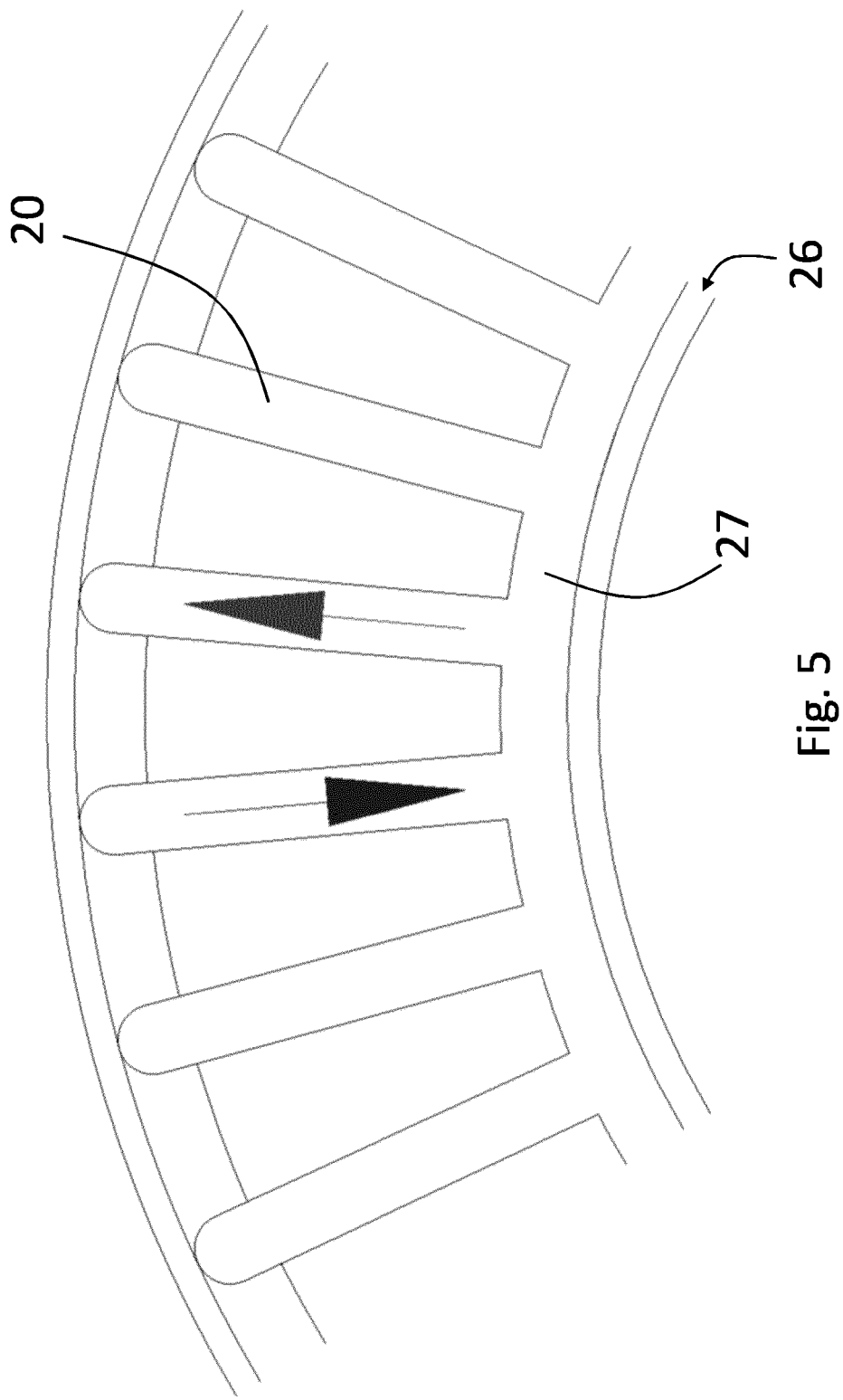
FIG. 5 is a scheme of cooling channels according to another embodiment.

FIG. 5 illustrates schematically a second arrangement of the channels 20 wherein the channels 20 connect to a chamber 27 which is also integrally formed within the cooled component of the burner. Said chamber 27, acting as a cooling medium collector, is located at the front portion of the cooled component, namely at the tip 26 in the example of the figures.

Figure 6:
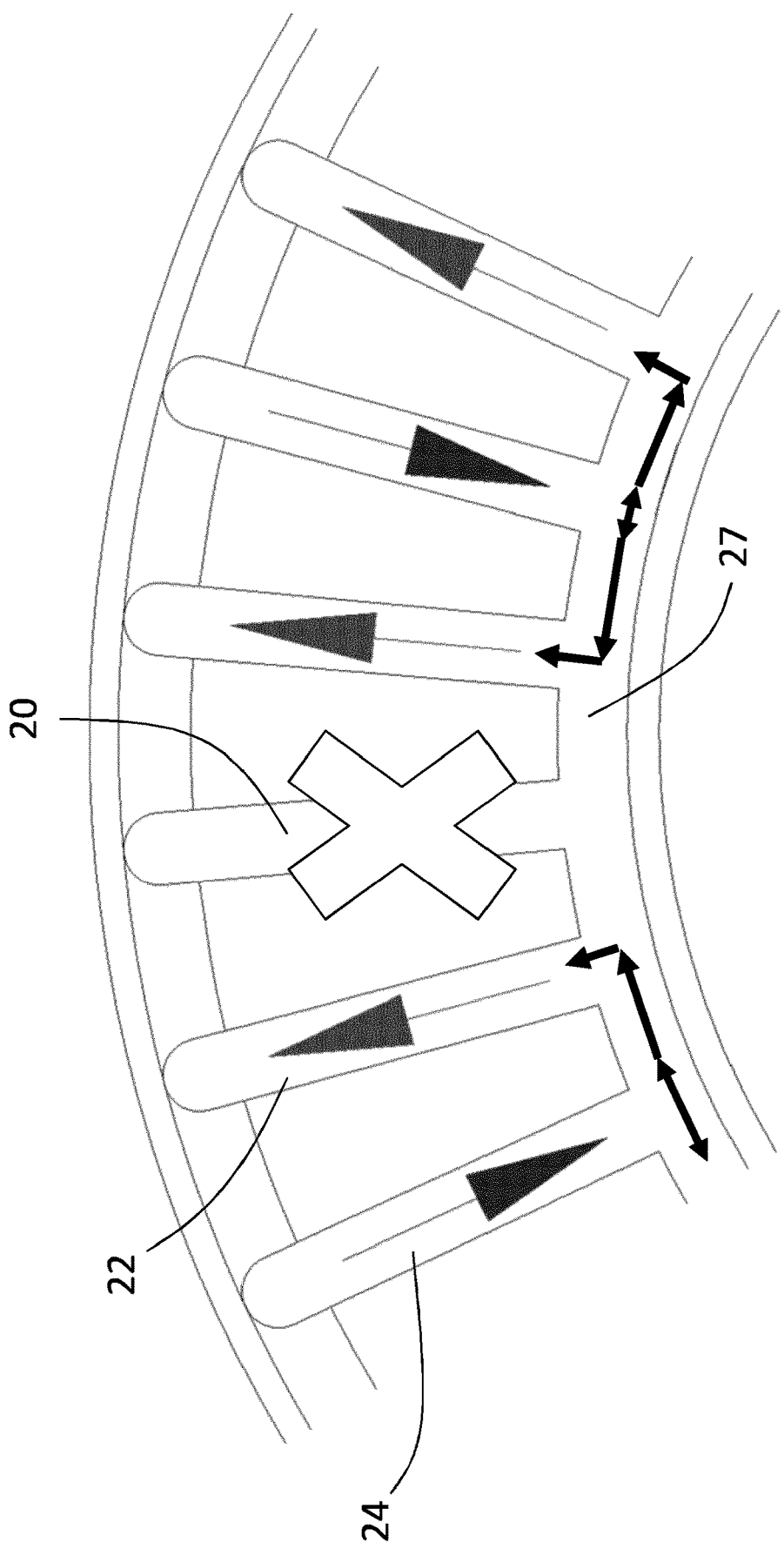
FIG. 6 illustrates the operation of cooling channels according to the scheme of FIG. 5.

FIG. 6 illustrates the advantage of the arrangement of FIG. 5. When a channel is obstructed, for example the channel 20 marked with "X" in the figure, the system is able to re-arrange the circulation of the cooling medium and to compensate for the channel out of operation thanks to the presence of the common chamber 27.

Particularly, the following effect shall be noted. If one of the channels is closed by obstruction, the flow in the adjacent channels is not reduced to null because the other inflow channels are able to provide the required cooling medium through the common collector chamber 27 on the tip. The closed channel also is in contact with the cooling medium both upstream and downstream of the occlusion and some cooling is provided by coolant reaching those regions by natural convection or random fluctuations due to turbulence. Also, the closure of a channel increases the flow in the others, especially the adjacent channels, thus increasing the cooling in the region adjacent to the closed channel and thus mitigating, by conduction through the body, the overheating in the closed channel.

What is claimed is:

1. A burner configured to feed a reactant stream and an oxidant stream into a reaction chamber, the burner comprising at least one cooled component, wherein said cooled component comprises:
   a plurality of channels arranged in parallel to convey a cooling medium across said cooled component of the burner;
   a cooling medium header and a cooling medium collector directly connected to said channels;
   wherein said channels, said cooling medium header and said cooling medium collector are integral within said cooled component of the burner;
   said burner including a cooling medium collection chamber, which is integrally formed within said component of the burner, said collection chamber being separated from said cooling medium header and from said cooling medium collector, and said collection chamber being directly connected to all said channels.

2. The burner according to claim 1, wherein said cooling medium collection chamber is located at a tip region of said cooled component.

3. The burner according to claim 1, wherein:
said cooled component of the burner is made with a 3D printing technique;
the channels, the cooling medium header and collector and, if provided, the cooling medium collection chamber, are made during the 3D printing of the cooled component.

4. The burner according to claim 1, wherein said channels are distributed on a circumference, thus forming a circular array of channels.

5. The burner according to claim 4, wherein inflow channels and outflow channels alternate in the array of channels.

6. The burner according to claim 1, wherein:
said channels have an equivalent diameter which, for each section of each channel, range from 20% to 90% of a local thickness of the cooled component around the section of the channel, and/or the distance between each pair of adjacent channels is 10% to 200% of a local thickness of the cooled component around the pair of channels, and/or for each cross section of the cooled component where cooling channels are present, the cross section being in a plane perpendicular to axes of the cooling channels, the channels are distributed over the entire cross section of said cooled component.

7. The burner according to claim 6, wherein:
said channels have an equivalent diameter which, for each section of each channel, range from 20% to 90% of a local thickness of the cooled component around the section of the channel, and/or the distance between each pair of adjacent channels is 10% to 90% of a local thickness of the cooled component around the pair of channels, and/or for each cross section of the cooled component where cooling channels are present, the cross section being in a plane perpendicular to axes of the cooling channels, the channels are distributed over the entire cross section of said cooled component.

8. The burner according to claim 1, wherein the cooling component comprises at least one region with a first number of channels and/or channel spacing, and a second region with a second and different number of channels and/or channel spacing, according to local cooling needs.

9. The burner according to claim 1, wherein the at least one cooled component of the burner includes a nozzle and a body coaxially arranged around the nozzle, the nozzle having a central aperture for one of the reactant stream and oxidant, and the body defining an annular passage around the nozzle for the other of the reactant stream and oxidant.

10. An equipment for the production of synthesis gas by reacting an oxidizable process gas with an oxidant gas, the equipment comprising a reaction chamber and a burner arranged to feed said process gas and oxidant gas into the reaction chamber, the burner being in accordance with claim 1.

11. An equipment according to claim 10, wherein the equipment is any of:
an autothermal reformer;
a non-catalytic partial oxidation reactor; a catalytic partial oxidation reactor.

12. A process for the production of a synthesis gas, including the steps of feeding an oxidizable process gas and an oxidant gas into a reaction chamber with a burner, including the use of an equipment according to claim 10.

13. A process for the production of a synthesis gas, including the steps of feeding an oxidizable process gas and an oxidant gas into a reaction chamber with a burner according to claim 1.

14. The process according to claim 13 for the production of a hydrogen-containing synthesis gas, the process being any of autothermal reforming, non-catalytic partial oxidation, or catalytic partial oxidation, said process gas being a hydrocarbon-containing gas or a partially reformed gas, said oxidant gas being any of air, oxygen-enriched air, or oxygen.

15. The method for the manufacturing of a burner for the production of synthesis gas, the burner being configured to feed a reactant stream and an oxidant stream into a reaction chamber, the method comprising the manufacturing of at least one cooled component of the burner with a plurality of internal channels arranged in parallel for the circulation of a cooling medium, the method including that said channels are made within the cooled component;
said burner being as claimed in claim 1.

16. The method according to claim 15, wherein the cooled component is made by additive manufacturing process and said channels for the cooling medium are made during the additive manufacturing process.

* * * * *